United States Patent
Arlt (10) Patent No.: US 10,495,517 B2
(45) Date of Patent: Dec. 3, 2019

(54) METHOD FOR NONCONTACT, RADIATION THERMOMETRIC TEMPERATURE MEASUREMENT

(71) Applicant: Keller HCW GmbH, Ibbenbüren-Laggenbeck (DE)

(72) Inventor: Uwe-Peter Arlt, Ibbenbüren (DE)

(73) Assignee: Keller HCW GmbH, Ibbenbüren-Laggenbeck (DE)

( * ) Notice: Subject to any disclaimer, the term of this patent is extended or adjusted under 35 U.S.C. 154(b) by 138 days.

(21) Appl. No.: 15/584,072

(22) Filed: May 2, 2017

(65) Prior Publication Data

US 2017/0314996 A1 Nov. 2, 2017

(30) Foreign Application Priority Data

May 2, 2016 (DE) .................. 10 2016 005 321

(51) Int. Cl.
  *G01J 5/06* (2006.01)
  *G01J 5/00* (2006.01)
  *G01J 5/24* (2006.01)
  *G01J 1/44* (2006.01)

(52) U.S. Cl.
  CPC .............. *G01J 5/06* (2013.01); *G01J 5/0003* (2013.01); *G01J 5/24* (2013.01); *G01J 2001/446* (2013.01); *G01J 2005/067* (2013.01)

(58) Field of Classification Search
  CPC ..... G01N 2201/121; G01N 2201/1211; G01N 2201/127; G01N 29/30; G01J 2005/067; G01J 5/0003; G01J 5/06; G01J 5/24; G01J 2001/446; G01J 1/4228; G01J 3/50; G01J 5/08; H01L 31/09
  See application file for complete search history.

(56) References Cited

U.S. PATENT DOCUMENTS 3,195,685 A * 7/1965 Blackstone ............ B60R 22/28
  188/372
5,897,610 A   4/1999 Jensen
(Continued)

FOREIGN PATENT DOCUMENTS

| JP | 05030314 A | * | 2/1993 |
| JP | 10051053 A | * | 2/1998 |
| JP | 2009253065 A | * | 10/2009 |

*Primary Examiner* — Gail Kaplan Verbitsky
(74) *Attorney, Agent, or Firm* — Gudrun E. Huckett (57) ABSTRACT

In a method for noncontact, radiation thermometric temperature measurement, a short-circuit photocurrent that is proportional to a received radiant power is produced in a photodiode radiation detector that is operating photovoltaically without bias voltage. The photocurrent is processed in a current to voltage converter. Subsequently, a temperature signal corresponding to the radiant power is generated. A corrective current, dependent on a temperature of the photodiode radiation detector, is added to the short-circuit photocurrent to compensate a fault current, wherein the fault current is based on an input bias current and an input offset voltage of the current to voltage converter across a temperature-dependent shunt resistance of the photodiode radiation detector. A device with a corrective current source controlled by a microcontroller is provided that can be used to perform the method.

9 Claims, 5 Drawing Sheets

(56) References Cited

U.S. PATENT DOCUMENTS

| | | | | |
|---|---|---|---|---|
| 6,013,919 A | * | 1/2000 | Schneider | F23N 5/082 |
| | | | | 250/554 |
| 6,956,195 B2 | | 10/2005 | Sakaguchi | |
| 8,773,336 B2 | * | 7/2014 | Knapp | G09G 3/2003 |
| | | | | 250/205 |
| 8,855,484 B2 | * | 10/2014 | Tsai | H04B 10/40 |
| | | | | 398/135 |
| 2011/0271697 A1 | * | 11/2011 | Sunaga | B60H 1/0075 |
| | | | | 62/126 |
| 2014/0291488 A1 | | 10/2014 | Laforce | |

* cited by examiner

METHOD FOR NONCONTACT, RADIATION THERMOMETRIC TEMPERATURE MEASUREMENT

BACKGROUND OF THE INVENTION

The invention relates to a method for noncontact, radiation thermometric temperature measurement. According to the method, photodiode radiation detector operating photovoltaically without bias voltage produces a short-circuit photocurrent which is proportional to the received radiant power. This photocurrent is processed in a current to voltage converter whereupon a temperature signal is generated which corresponds to the radiant power and, for example, is sent on to a temperature display. Moreover, the invention concerns a device for performing this method.

Noncontact, radiation thermometric temperature measuring methods as well as suitable devices, referred to as pyrometers, are known. The employed photodiode radiation detectors generate a photocurrent which is proportional to the radiant power. The radiant power of an object to be measured for a measuring wavelength of ≤2.4 µm can change, for example, in a temperature range of the object to be measured of 50° C. to 700° C., by almost six orders of magnitude. Correspondingly, the photocurrent changes also by six orders of magnitude.

In order to realize a great current dynamics range of approximately six decades in a continuous measuring range, different concepts are known. In the known methods, the photodiode current is converted to voltage which is subsequently further processed, for example, amplified.

The photodiode radiation detectors which are suitable for noncontact, radiation thermometric temperature measurement exhibit, depending on the material, different dark resistances or shunt resistances. This resistance amounts to several GΩ in case of silicon diodes with long wave sensitivity limit of $\lambda_c$=1.1 µm. In case of InGaAs diodes with $\lambda_c$=1.7 µm, the resistance amounts to several 10 MΩ. In case of extended InGaAs diodes with $\lambda_c$=2.6 µm, the resistance amounts to a few kΩ. Moreover, these shunt resistances are strongly dependent on the radiation detector temperature. In case of extended InGaAs photodiodes with $\lambda_c$=2.6 µm, the resistance decreases, for example, to one tenth for each temperature increase of 34K.

For the current to voltage conversion, operational amplifiers are employed. They have an input offset voltage and an input bias current. High-quality chopper operational amplifiers have a typical input offset voltage of ≤2.5 µV and an input bias current of ≤400 pA.

When measuring an object with low object temperature <75° C., the radiation intensity and thus also the photocurrent are very small. The photocurrent is within an order of magnitude of a few pA. Depending on the quality of the employed operational amplifier, the measurement of small photocurrents is error-prone to a great extent or such a measurement is even impossible. Methods for noncontact, radiation thermometric temperature measurement as well as the associated devices with photoelectric radiation detectors with a spectral range up to approximately 2.6 µm are therefore used only at temperatures above 100° C. Moreover, the object temperature should be approximately 25 to 30 Kelvin above the device temperature. For improving the methods and devices, temperature-stabilized radiation detectors can be employed which however require 15 to 30 minutes for heating up to operating temperature and also have an increased current consumption for heating. Other devices employ an optical chopper for signal stabilization according to the pulsating light method.

Object of the present invention is to improve a method for noncontact, radiation thermometric temperature measurement as well as a device suitable for the method in such a way that by means of a robust and potentially mobile device a simple and quick temperature measurement at object temperatures of <75° C., in particular at an object temperature at 50° C. and up, can be carried out accurately enough.

SUMMARY OF THE INVENTION

This object is solved for the method in that a corrective current, which is dependent on the temperature of the photodiode radiation detector, is added to the short-circuit photocurrent for compensation of a fault current that is comprised of the input bias current as well as the input offset voltage of the current to voltage converter across the temperature dependent shunt resistance of the photodiode radiation detector.

This object is further solved for the device in that the device comprises a corrective current source that can be digitally controlled and is additively connected to the input of the current to voltage converter as well as a microcontroller unit that controls the corrective current source and comprises a microcontroller and a memory unit which is correlated with the microcontroller.

In the method according to the invention, a corrective current is thus added to the short-circuit photocurrent for the purpose of compensation of a fault current, composed of the input bias current and the input offset voltage of the current to voltage converter across the temperature dependent shunt resistance of the photodiode radiation detector, at a location upstream of or at the input of the current to voltage converter. In this way, the influence of the fault current on the temperature signal, generated downstream of the current to voltage converter based on the voltage, is eliminated. The method can thus be used even for low radiant power of the object to be measured and the minimal photocurrents associated with low radiant power.

Advantageously, the temperature of the photodiode radiation detector is determined by means of a temperature sensor at the radiation detector. The corrective current can be adjusted in accordance with the temperature of the photodiode radiation detector. Accordingly, the temperature dependency of the shunt resistance of the photodiode radiation detector on case of a temperature change of the radiation detector, for example, during measurement or between individual measurements, can be compensated. A temperature stabilization of the radiation detector for improving the measurement precision that requires increased current consumption and longer heating periods is thus not necessary In a preferred embodiment of the method, the corrective current is adjusted as a function of the temperature of the photodiode radiation detector by means of a current source which is controlled by a microcontroller. The control of the current source follows a temperature-dependent equation which is stored in a memory unit correlated with the microcontroller. By means of the control of the current source by a microcontroller, the corrective current can be adjusted precisely so that the corrective current compensates the fault current with satisfactory accuracy.

Advantageously, the control of the temperature-dependent corrective current is realized by means of the following equation stored in the memory unit correlated with the microcontroller:

$$I_K = C\left(K_1 + K_2\left(10^{\frac{T-T_0}{T_{Diff}}} - 1\right)\right)$$

In this equation, $I_k$ means the corrective current, $K_1$ and $K_2$ are calibration constants, $T_{Diff}$ refers to the temperature difference at which the shunt resistance of the photodiode employed in the radiation detector changes by one order of magnitude, $T$ means the temperature of the photodiode radiation detector, and $T_0$ refers to a reference temperature. $C$ is a device-specific or component-specific constant.

A corrective current which is generated in accordance with this equation has a temperature-independent proportion that is determined by the constant $K_1$ as well as a temperature-dependent proportion that is determined by the temperature $T$ as well as the constant $K_2$ and $T_{Diff}$. By using, an equation of the represented form, the temperature-independent fault current components as well as the temperature-dependent fault current proportions can be corrected. By means of the corrective current, the fault current can be compensated, in particular also in case of changing temperatures of the photodiode radiation detector.

In a preferred embodiment of the method, the calibration constants $K_1$ and $K_2$ can be determined experimentally. First, the calibration constants are adjusted such that they do not cause corrective contributions and the photodiode radiation detector is brought to a reference temperature $T_0$. Subsequently, the photodiode radiation detector is placed in front of a black body (full radiator) with a low known temperature of, for example, 60° C. and the calibration constant $K_1$ is adjusted such that the propagated temperature signal corresponds to the known temperature of the black body (full radiator).

Subsequently, the photodiode radiation detector is heated to a different temperature, for example, $T=T_0+25$ K, and the device is then placed again in front of the same black body with the same known low temperature of, for example, 60° C. Subsequently, the calibration factor $K_2$ is adjusted until the temperature signal corresponds again to the known temperature of the black body.

With this procedure, the component-dependent constants $K_1$ and $K_2$ can be reliably determined for each of the photodiode radiation detectors employed in the method as well as for the employed current to voltage converters. The equation with the corresponding constants is stored in the memory unit of the correlated microcontroller.

The object is further solved by a device for noncontact, radiation thermometric temperature measurement. This device comprises a photodiode radiation detector which generates a short-circuit photo current proportional to the radiation intensity. Moreover, the device comprises a current to voltage converter which is configured to process the short-circuit photocurrent and further comprises an output device for outputting a temperature signal corresponding to the radiation intensity. The device comprises a corrective current source which is additively connected to the input of the current to voltage converter and can be digitally controlled. Moreover, the device comprises a microcontroller unit by means of which the corrective current source can be controlled and which comprises a microcontroller and a memory unit correlated with the microcontroller. As explained above, the corrective current source, controlled by the microcontroller unit, generates a corrective current which is added upstream of or at the input of the current to voltage converter to the short-circuit photocurrent of the photodiode radiation detector.

Preferably, a device is employed in which the photodiode radiation detector has a shunt resistance of <1 MΩ. This applies in particular to extended InGaAs diodes with a long wave sensitivity limit of $\lambda_c=2.6$ μm. The specification of the shunt resistance of the photodiode radiation detector refers in this context to room temperature. Higher long wave sensitivity limits are in principle more suitable for the measurement of lower temperatures. However, here the internal shunt resistance is regularly lower.

Preferably, the corrective current source is embodied as a digital analog converter (D/A converter) with a downstream voltage to current converter. Due to this circuitry, a simple generation of the desired corrective current and a simple control of the corrective current source by means of the digital analog converter are possible.

In an advantageous emboli merit of the device, a temperature sensor is arranged at the photodiode which produces a temperature-dependent control signal for the microcontroller unit. Due to this arrangement, the photodiode radiation detector temperature can be transmitted to the microcontroller and the microcontroller can control the digitally controllable current source for generating a corresponding corrective current.

In a preferred embodiment, the corrective current source which is downstream of the digital analog converter comprises a differential amplifier whose output voltage reference potential relates to the cathode of the photodiode of the radiation detector. The output of the corrective current source is connected by at least one resistor with the anode of the photodiode.

DESCRIPTION OF THE PREFERRED EMBODIMENTS

Individual technical features of the embodiment described in the following can be combined also with afore described embodiments as well as with features of one of the independent claims and possibly further claims to other configurations in accordance with the invention.

Inasmuch as applicable, elements that are functionally the same are identified with same reference characters.

Figure 1:
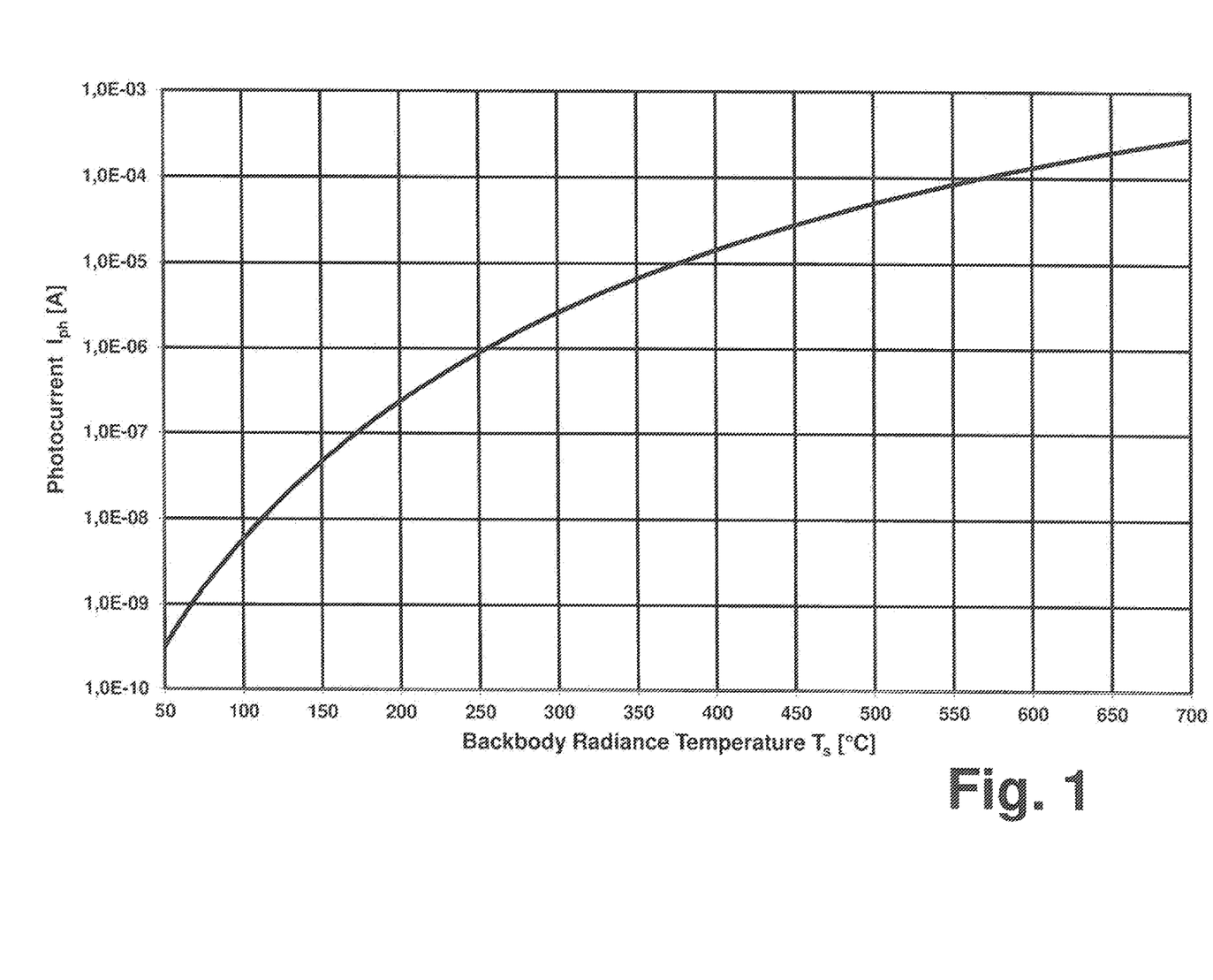
FIG. 1 illustrates the photocurrent of a photodiode radiation detector as a function of the temperature of a black body as an object to be measured.

FIG. 1 shows the photocurrent of a photodiode radiation detector as a function of the temperature of a black body as an object to be measured. It can be clearly seen that the photocurrent changes in a temperature range of 50° to 700° across six orders of magnitude. In this context, the relative change of the photocurrent based on temperature change is more pronounced for low temperatures than for high temperatures. Below a temperature of the black body of 120° C., the current drops from a range of approximately 10 nA to a few 100 pA at 50° C.

Figure 2:
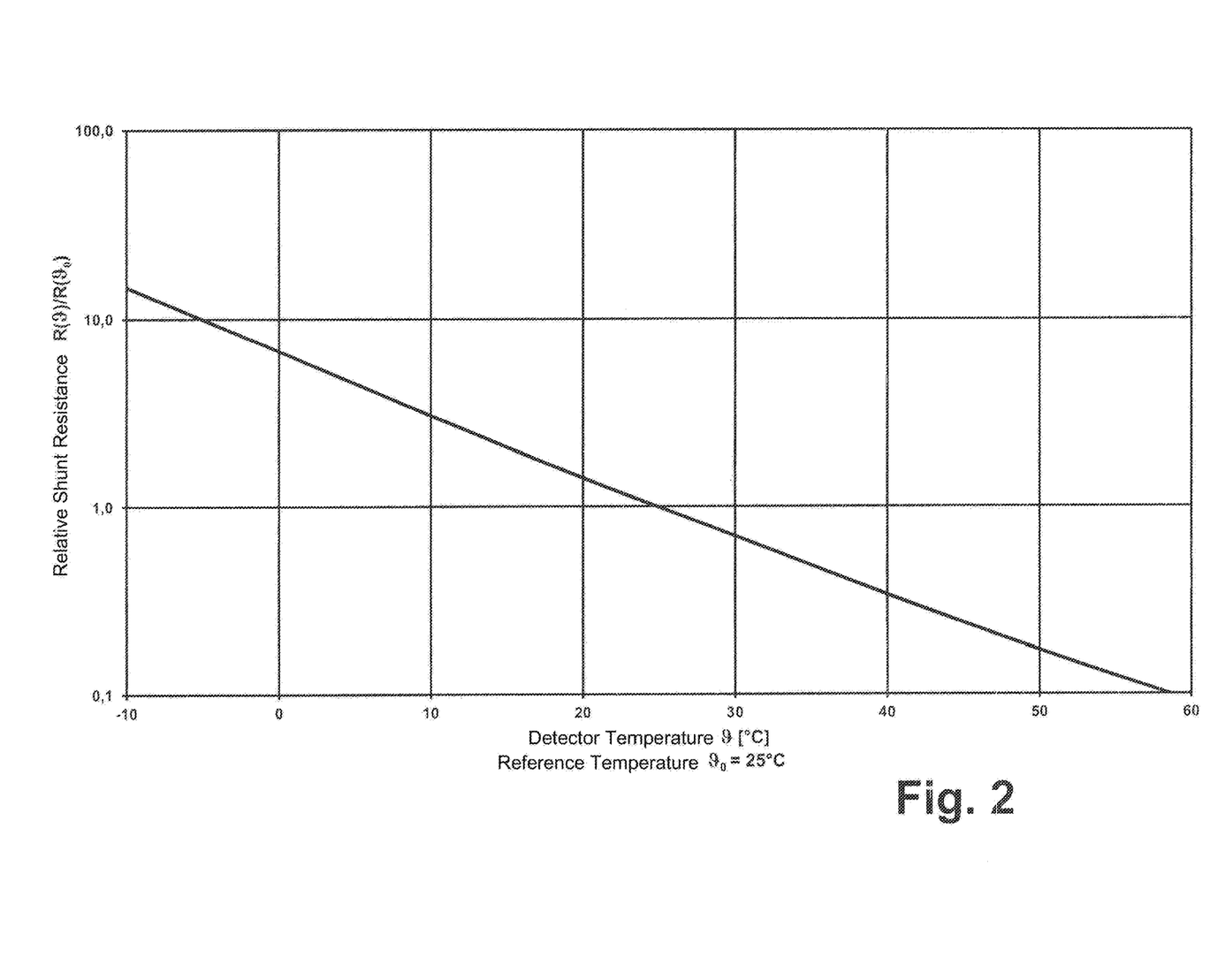
FIG. 2 illustrates the relative shunt resistance of the photodiode radiation detector as a function of its temperature.

In FIG. 2, the change of the shunt resistance of the photodiode as a function of the temperature of the photodiode radiation detector is illustrated relative to the resistance at reference temperature of 25° C. In the illustrated temperature range of −10° C. to 60° C., the shunt resistance changes by two orders of magnitude. This change follows the equation as shown below:

$$R_s = R_0 \left( 10^{\frac{T_0 - T}{T_{Diff}}} \right)$$

wherein $R_s$ means the shunt resistance as a function of the photodiode radiation detector temperature, $R_0$ means the shunt resistance at a reference temperature $T_0$, and $T_{Diff}$ means the temperature difference that causes a change of the resistance by one decade. $T_{Diff}$ and the temperature difference $T_0 - T$ are to be put into the equation with the same units, here with the employed unit K.

It has been found that a relevant temperature-dependent fault current flows across the varying shunt resistance due to the input offset voltage of an operational amplifier.

Figure 3:
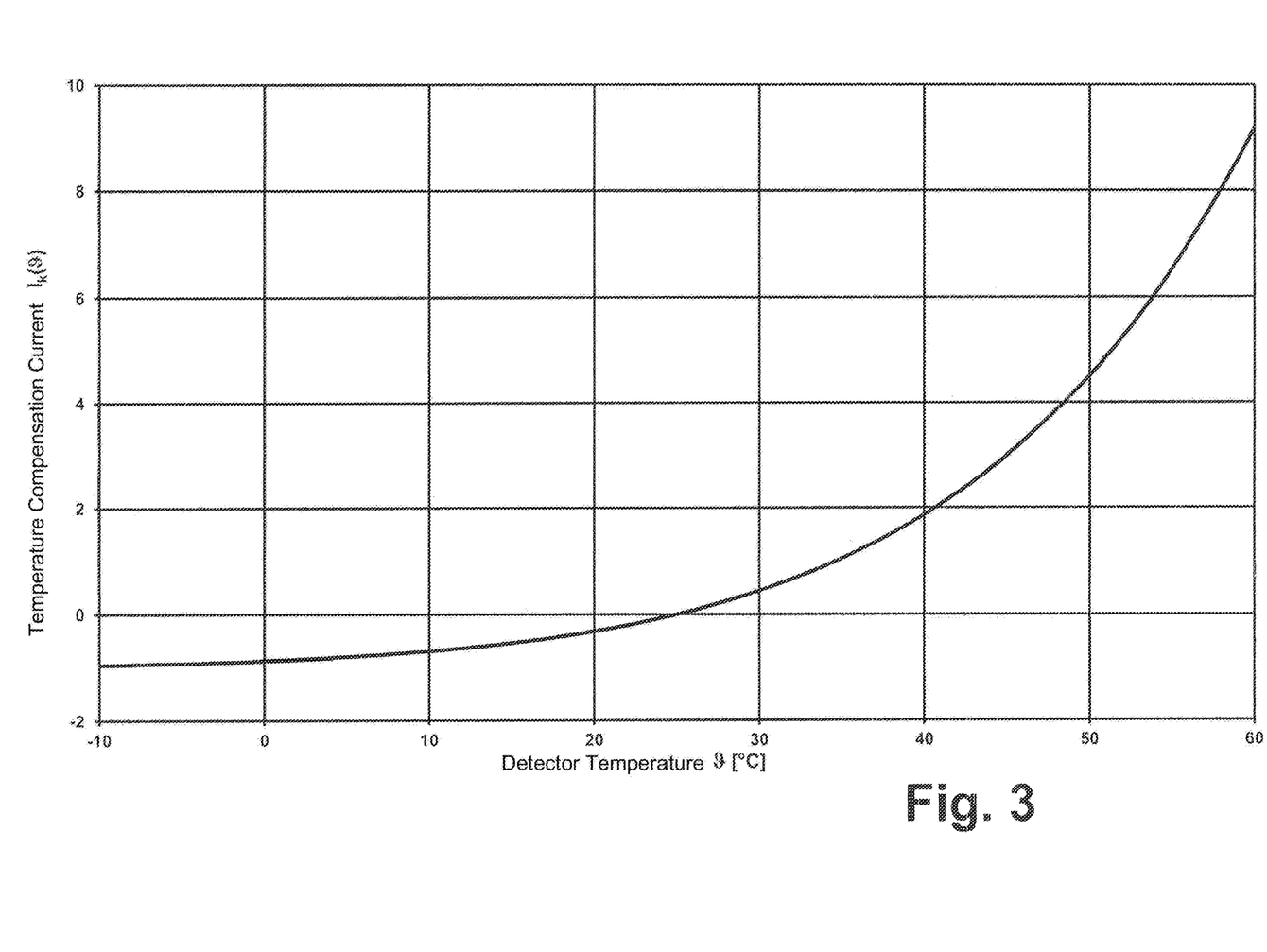
FIG. 3 illustrates the temperature compensation current $I_K$ as a function of the temperature of the photodiode radiation detector.

In FIG. 3, the temperature compensation current $I_K$ is illustrated as a function of the temperature of the photodiode radiation detector. This curve represents the temperature-dependent corrective current. The corrective current is determined to be 0 at a reference temperature of 25° C. because here no correction of the temperature effect is performed.

Figure 4:
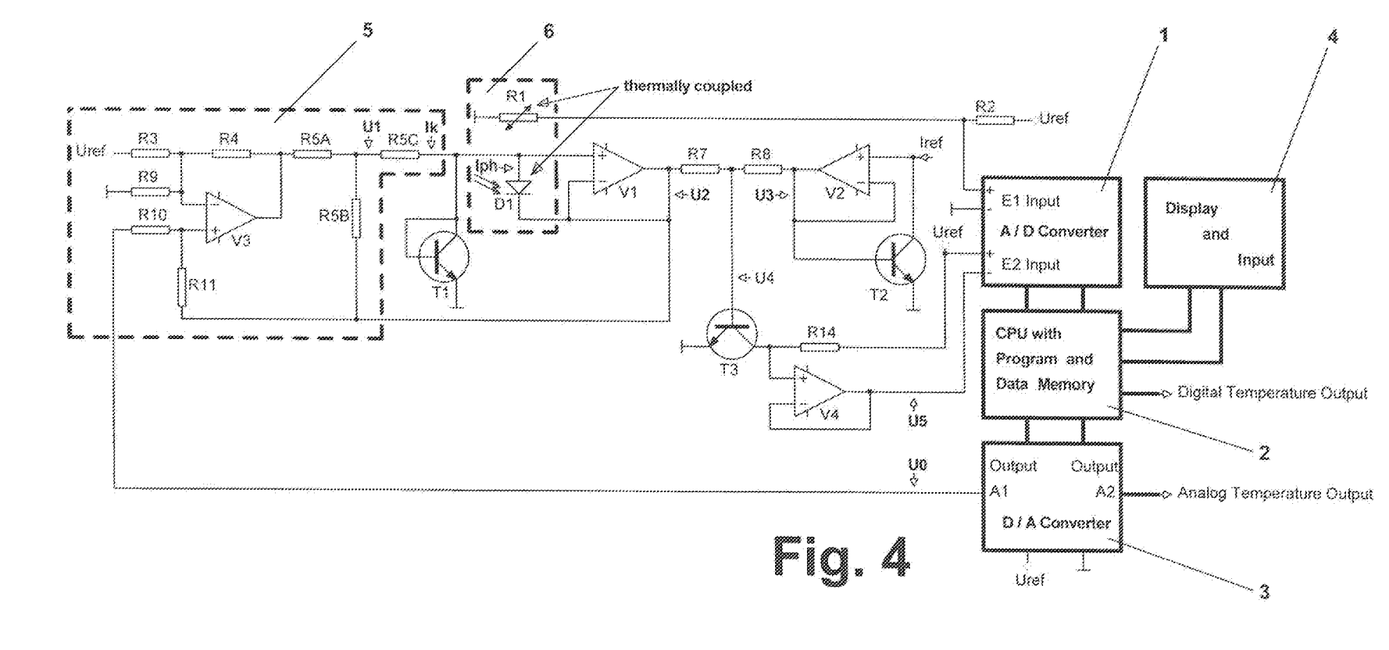
FIG. 4 is a circuit diagram of an implementation of the invention.

FIG. 4 shows a circuit diagram of a pyrometer with photodiode radiation detector and a current to voltage converter circuit with exponentiating transfer characteristic for dynamics compression. The circuit diagram comprises A/D converter 1; CPU 2; D/A converter 3; display and input 4; corrective current source 5; and temperature sensor 6.

The preamplifier is constructed of the operational amplifiers V1, V2, and V4 and compresses the great dynamic range of the photocurrent Iph of the photodiode D1. The current which is applied by D1 flows through the transistor T1 which is connected as a diode and generates a voltage drop between collector/base and emitter which corresponds to the logarithm of the photocurrent Iph. This voltage appears as U2 at the output of the chopper operational amplifier V1 which is connected as a unity gain amplifier. Since the anode of diode D1 is connected with the non-inverting input and the cathode with the inverting input of the amplifier, only the input offset voltage of the operational amplifier V1 is applied to the photodiode and only a small fault current can thus flow across the shunt resistance of the photodiode.

At the output of the amplifier V2 which, like V1, is connected also as a unity gain amplifier, the voltage U3 appears which is logarithmized from the reference current Iref across the transistor T2. At the outputs of V1 and V2, between the voltages U2 and U3, a voltage divider is provided which is formed of the resistors R7 and R8 and whose divided voltage U4 is applied to the base of the transistor T3.

$$U_4 = U_2 \frac{R_8}{R_7 + R_8} + U_3 \frac{R_7}{R_7 + R_8}$$

In this way, the transistor T3 is acting for the output voltage U5 as an e-function generator with divided voltage U4 as input parameter. In this way, the circuit functions for the input current Iph as an exponentiating device whose exponent can be determined by means of a voltage divider based on the resistors R7 and R8 that are preferably designed with narrow tolerances. The exponents n and m are for Iph: n=R8/(R7+R8) and for Iref: m=R7/(R7+R8). It is not problematic that, depending on the selection of the resistors, the exponents n and m can be different because Iref as constant current can be selected freely so as to match the desired operating point adjustment. In order for the base current of T3 not to impermissibly change the output voltage of the voltage divider, the two resistors R7 and R8 are selected to be so low ohmic, preferably in a range of preferably 100Ω to 500Ω, that in this way an additional impedance converter upstream of the base connector of T3 is not required. Despite of this, the current which is flowing through this voltage divider still remains relatively low because the voltage difference U2−U3, due to the currents being logarithmized, is only in the range of maximally 100 mV-200 mV.

The circuitry principle which is illustrated in FIG. 4 has several advantages relative to alternative solutions in which the logarithmic transistor is integrated in common base configuration in the negative feedback branch of an operational amplifier.

The transistor T1 generates no voltage amplification which can impair the stability of the operational amplifier when the voltage-amplifying transistor in common base configuration is integrated in the negative feedback branch of the amplifier. Depending on the collector current, a current-dependent oscillating tendency of the circuitry is thereby generated that can be eliminated by measures that reduce the amplifier bandwidth; however, this undesirably prolongs the signal settling time for small photocurrents.

The circuitry expenditure for the exponentiating circuit for signal dynamics compression is very minimal with three impedance converters and three transistors.

The circuitry requires only a unipolar supply voltage wherein approximately 3 V-5 V are sufficient for operation. Accordingly, the power loss, inherent heating of the circuitry, and the complexity of the voltage supply can be significantly reduced.

The transistors T1 to T3 are all connected with their emitters to a common ground so that transistors on a monolithic transistor array can be used without thereby producing, due to different voltage potentials between the transistors, substrate leakage currents which for small measured currents then would generate disruptive fault currents. The monolithic configuration provides in addition a good synchronization of the transistor characteristic line for fluctuating environmental temperature which is desirable for a low-drift operation of the circuit.

The compensation device is comprised of a digital analog converter (D/A converter) controllable by a microcontroller; its output voltage U0 can be changed from ground potential to Uref and generates in the downstream differential amplifier V3 the output voltage U1 which does not relate to the ground potential of the D/A converter but to the cathode potential of the photodiode D1 (voltage U2). Because the required input compensation current at V1, depending on the situation of the component tolerance, can have a positive as well as a negative sign, the resistor circuit of V3 is designed such that the output voltage U1 relative to U2 can be changed bipolar. Accordingly, for the D/A converter output voltage U0=0, the voltage difference U1−U2 reaches the negative maximum value; U1−U2=0 for U0=Uref/2; and U1−U2 reaches the positive maximum value for U0=Uref. The voltage difference U1−U2 then produces across the high ohmic resistor R5C the desired corrective current with positive or negative sign.

In order to keep disturbing effects of V3 due to voltage drift and noise at a minimum for the photocurrent measurement, the resistor R5C in relation to the shunt resistance Rsh of the photodiode is high ohmic, preferably with R5C≥1,000×Rsh. Since the chopper operational amplifier used for V1 requires only small corrective currents ≤1 nA, fulfilling this condition by high ohmic resistors of e.g. ≥100 MΩ is possible. When, however, high ohmic resistors are not available in the desired quality and configuration, the output voltage of V3, of course, can also be applied through a voltage divider R5A and R5B to the resistor R5C. Under this condition, R5C should always be greater than Rsh, preferably R5C≥5 Rsh, in order not to unnecessarily reduce the effective parallel resistance at the measuring input because otherwise the signal/noise ratio of the input stage decreases.

Figure 5:
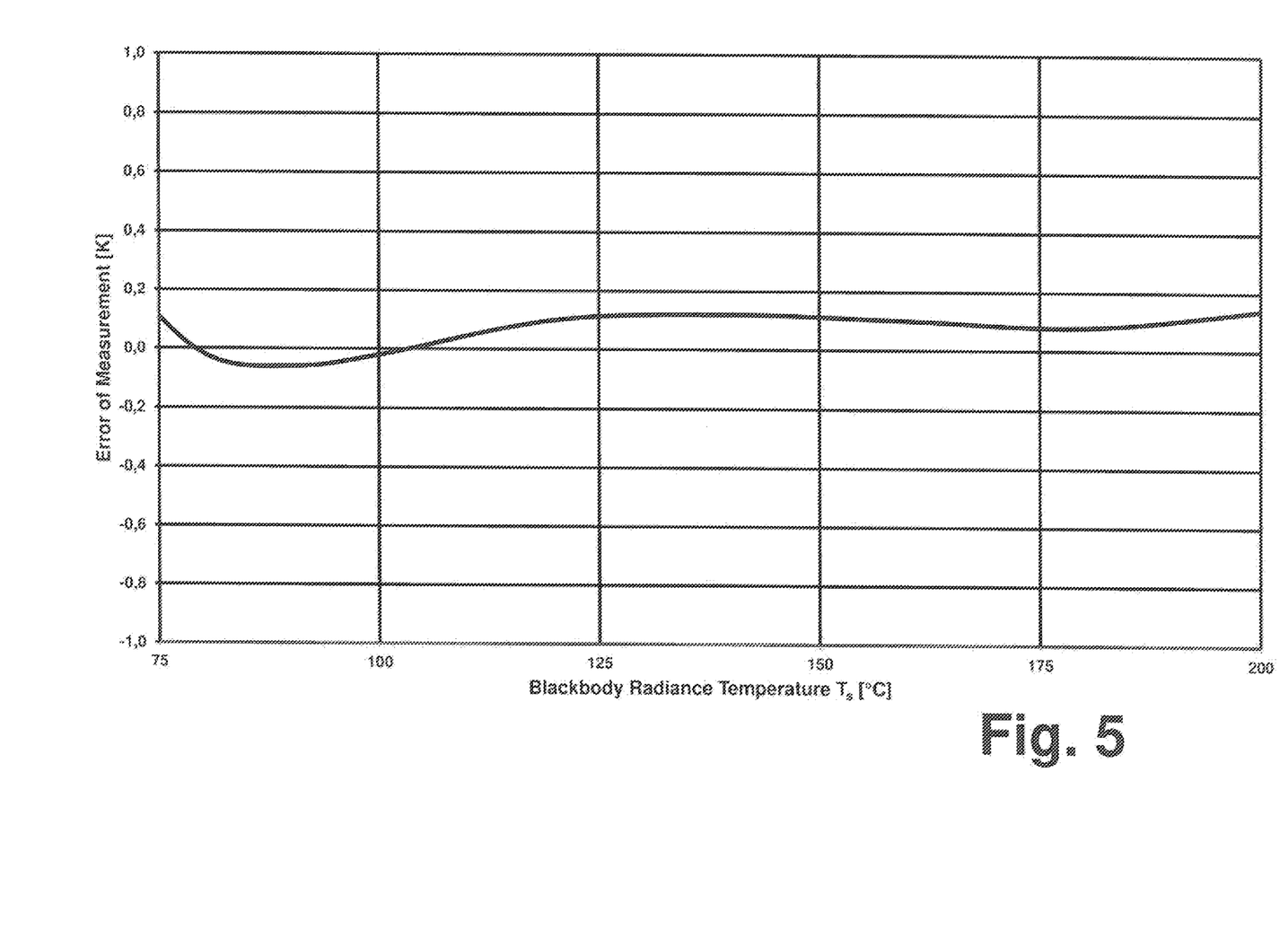
FIG. 5 illustrates the measuring deviation when measuring the temperature of a black body as a function of the temperature of the radiator when using the method according to the invention.

FIG. 5 shows the measuring imprecision in the form of the deviation of the measured temperature from the known temperature of a black body for measurement with the method according to the invention and a device designed for this method. Here, the measuring deviations across a temperature range of 75° C. to 200° C. are in a range of <±0.2 K. This demonstrates the high measuring precision that can be achieved with the method according to the invention for noncontact, radiation thermometric temperature measurement.

The specification incorporates by reference the entire disclosure of German priority document 10 2016 005 321.6 having a filing date of May 2, 2016.

While specific embodiments of the invention have been shown and described in detail to illustrate the inventive principles, it will be understood that the invention may be em bodied otherwise without departing from such principles.

What is claimed is:

1. A method for noncontact, radiation thermometric temperature measurement, the method comprising:
producing in a photodiode radiation detector, operating photovoltaically without bias voltage, a short-circuit photocurrent that is proportional to a received radiant power;
determining a temperature of the photodiode radiation detector by a temperature sensor arranged at the photodiode radiation detector and supplying the detected temperature of the photodiode radiation detector to a microcontroller;
calculating, based on the detected temperature of the photodiode radiation detector, a corrective current with a temperature-dependent equation stored in a memory unit of the microcontroller;
processing the short-circuit photocurrent in a current to voltage converter;
adding the corrective current to the short-circuit photocurrent for compensation of a fault current, wherein the fault current is comprised of an input bias current and an input offset voltage of the current to voltage converter across a temperature-dependent shunt resistance of the photodiode radiation detector;
generating subsequently a temperature signal of the measured temperature corresponding to the radiant power and outputting the temperature signal on an output device.

2. The method according to claim 1, wherein the step of adding includes controlling a corrective current source by the microcontroller based on the calculated corrective current.

3. The method according to claim 2, further comprising determining the corrective current based on the following equation:

$$I_K = C\left(K_1 + K_2\left(10^{\frac{T-T_0}{T_{Diff}}} - 1\right)\right)$$

wherein T means the temperature of the photodiode radiation detector, $T_0$ refers to a predetermined reference temperature of the photodiode radiation detector, $T_{Diff}$ refers to a temperature difference at which the shunt resistance of the photodiode radiation detector changes by one order of magnitude, $K_1$ and $K_2$ are calibration constants, and C is a device-specific constant.

4. The method according to claim 3, further comprising determining the calibration constants $K_1$ and $K_2$ by:
a) adjusting the calibration constants $K_1$ and $K_2$ so that the calibration constants $K_1$ and $K_2$ cause no corrective contribution to the current;
b) bringing the photodiode radiation detector to the reference temperature $T_0$;
c) selecting a black body and measuring a known temperature of the black body with the photodiode radiation detector;
d) subsequently, adjusting the calibration constant $K_1$ until the generated temperature signal corresponds to the known temperature of the black body;
e) bringing the photodiode radiation detector to a temperature different from the reference temperature;
f) subsequently, measuring the temperature of a black body with the same known temperature as in step c) with the photodiode radiation detector;
g) subsequently, adjusting $K_2$ until the generated temperature signal corresponds to the known temperature of the black body.

5. A device for noncontact, radiation thermometric temperature measurement for performing the method according to claim 1, the device comprising:
a photodiode radiation detector, operating photovoltaically without bias voltage, configured to produce a short-circuit photocurrent proportional to a radiation intensity detected by the photodiode radiation detector;
a current to voltage converter configured to process the short-circuit photocurrent;
an output device for outputting a temperature signal corresponding to the radiation intensity;
a digitally controllable corrective current source additively connected to an input of the current to voltage converter and configured to add the corrective current to the short-circuit photo current for compensation of the fault current;
a microcontroller unit operatively connected to the corrective current source to control the corrective current source, wherein the microcontroller unit comprises a microcontroller and a memory unit correlated with the microcontroller.

6. The device according to claim 5, wherein the photodiode radiation detector has a shunt resistance of less than 1 MΩ.

7. The device according to claim 5, wherein the corrective current source is a digital analog converter with a downstream voltage to current converter.

8. The device according to claim 7, wherein the photodiode radiation detector comprises a photodiode with a cathode and an anode, wherein the corrective current source is arranged downstream of the digital analog converter and comprises a differential amplifier having an output voltage reference potential that relates to the cathode of the photodiode, wherein the corrective current source comprises an output connected by at least one resistor to the anode of the photodiode.

9. The device according to claim 5, further comprising a temperature sensor arranged on the photodiode, wherein the temperature sensor is configured to produce a control signal supplied to the microcontroller unit for controlling the corrective current source.

* * * * *